United States Patent Office 2,859,992
Patented Nov. 11, 1958

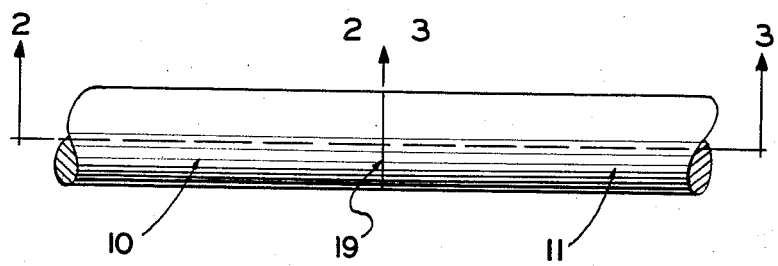
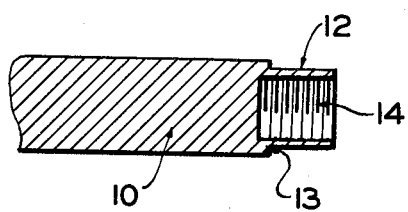
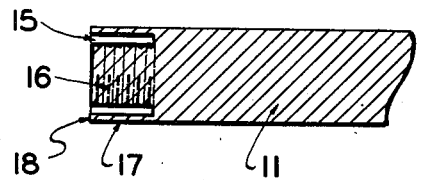
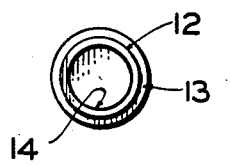
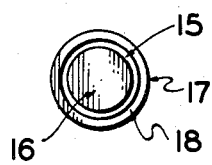
SAMUEL L. LEVY
INVENTOR.

2,859,992

SCREW JOINT

Samuel L. Levy, Decatur, Ill.

Application July 15, 1957, Serial No. 671,802

1 Claim. (Cl. 287—125)

This invention relates to screw joints and especially such joints as are used for the connection of aligned handle sections of rods or bars forming the handles of fishermen's dip nets and other similar devices thus enabling the sections to be conveniently separable for storage, packaging and shipping.

One important object of this invention is to provide a novel device of the kind wherein the threaded portions of the joint are protected from contact against objects injuring such threads.

Another important object of the invention is to provide a joint of the kind in which the threaded portions when joined are enclosed in a water-tight casing.

A further object of this invention is to provide a screw joint having such an injury-protective and water-sealed character having no loose parts and requiring no tools for its operation.

A further object of the invention is to lend strength to a screw joint.

With the above and other objects in view the invention consists in general of certain novel arrangements of parts and combinations of elements hereinafter fully described and illustrated in the accompanying drawings and particularly claimed.

In the drawings like characters of reference indicate like parts in the several screws, and:

Fig. 1 is a side elevation showing portions of the jointed ends of a pair of bar sections embodying this joint.

Fig. 2 is a section on the line 2—2 of Fig. 1 and illustration of the left hand part of that figure.

Fig. 3 is a view similar to Fig. 2 but showing the right hand part of Fig. 1.

Fig. 4 is an end elevation of the part shown in Fig. 2.

Fig. 5 is an end elevation of the part shown in Fig. 3.

In the form of the invention as disclosed in the drawings there is shown a pair of bar sections 10 and 11 of circular cross-sections. The section 10 has its end reduced as at 12 to provide an abrupt annular shoulder 13. Extending inwardly of this end is a bore 14 provided with internal screw threads as clearly shown in Fig. 2.

Formed within the opposing end of the section 11 is an annular channel 15 which may be produced by means of a hollow drill. The major diameter of the channel 15 is such as to fit closely over the reduced portion 12 of the section 10. The minor diameter of the channel 14 provides a core 16 externally screw threaded as shown in Fig. 3, which is adapted to have secure engagement with the threads in the bore 14.

The channel 15 further provides a shell 17 having a flat annular face 18 which, upon the sections 10 and 11 being screwed together, abuts solidly against the shoulder 13 and thus forms a water tight joint at 19.

It will now be plain that the threads of this joint, being securely enclosed within the other surfaces of the sections 10 and 11, will be at all times protected from damage by contact with an object which might damage the threads on contact. For this reason the joint may be made of such light metal as aluminum or the like. Furthermore the fitting of the part 12 within the channel 15 and the abutment of the faces 13 and 18 insure a water tight joint so that the joint may even be immersed in salt water without danger of corrosion. The shell fitting snugly against the annular shoulder only lends strength to the joint.

What is claimed is:

In a joint of the kind described, a pair of sections of equal external diameters throughout, one of said sections having a cylindrical channel formed in its end, said channel providing a centrally disposed threaded core and an outer wall concentric to and of equal length to said core, the ends of the core and wall being in the same plane transverse the section, the other section having a reduced end of equal external diameter equal to the internal diameter of the wall, said reduced end being internally threaded and engageable on said core, the reduced end providing a shoulder seating on the end of said wall.

References Cited in the file of this patent

UNITED STATES PATENTS 971,794    Scott _____ Oct. 4, 1910
2,250,495   Miller _____ July 29, 1941